US012654318B2

(12) United States Patent
Arcand et al.

(10) Patent No.: US 12,654,318 B2
(45) Date of Patent: Jun. 16, 2026

(54) SYSTEM AND METHOD FOR ROBOTIC AGENT MANAGEMENT

(71) Applicant: ServiceNow, Inc., Santa Clara, CA (US)

(72) Inventors: Jean-Francois Arcand, Montreal (CA); Marie-Claude Cote, Montreal (CA); Alexei Nordell-Markovits, Montreal (CA); Andrej Todosic, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 1065 days.

(21) Appl. No.: 17/250,915

(22) PCT Filed: Sep. 26, 2019

(86) PCT No.: PCT/CA2019/051375
§ 371 (c)(1),
(2) Date: Mar. 26, 2021

(87) PCT Pub. No.: WO2020/061699
PCT Pub. Date: Apr. 2, 2020

(65) Prior Publication Data
US 2021/0339389 A1 Nov. 4, 2021

Related U.S. Application Data

(60) Provisional application No. 62/738,463, filed on Sep. 28, 2018.

(51) Int. Cl.
*B25J 9/00* (2006.01)
*B25J 9/16* (2006.01)
(Continued)

(52) U.S. Cl.
CPC ........... *B25J 9/1661* (2013.01); *B25J 9/0084* (2013.01); *B25J 9/161* (2013.01); *G06N 3/08* (2013.01);
(Continued)

(58) Field of Classification Search
CPC ........ B25J 9/1661; B25J 9/0084; B25J 9/161; B25J 9/163; G06N 3/08; G06N 5/046;
(Continued)

(56) References Cited

U.S. PATENT DOCUMENTS

| | | | |
|---|---|---|---|
| 7,765,028 B2 | 7/2010 | Orita | |
| 9,817,967 B1 | 11/2017 | Shukla et al. | |

(Continued)

FOREIGN PATENT DOCUMENTS

| | | | |
|---|---|---|---|
| CA | 2982330 A1 | 6/2018 | |
| CN | 107291078 A | 10/2017 | |
| CN | 107803834 A | 3/2018 | |
| WO | 2018044820 A1 | 3/2018 | |

OTHER PUBLICATIONS

Li Tao et al. "FIU-Miner (a fast, integrated, and user-friendly system for data mining) and its applications", Knowledge and Information Systems, Springer Verlag,London, GB, vol. 52, No. 2, Dec. 23, 2016, pp. 411-443, XP036272527, ISSN: 0219-1377, DOI:10.1007/S10115-016-1014-0 [retrieved on Dec. 23, 2016].

*Primary Examiner* — Ian Jen
(74) *Attorney, Agent, or Firm* — FLETCHER YODER PC

(57) ABSTRACT

Systems and methods for managing and enhancing the performance of a number of robotic agents. An orchestrator module receives work output from a number of robotic agents and determines whether efficiencies can be obtained by rescheduling tasks and/or steps executed by the various robotic agents. As well, the orchestrator learns the various actions and values used by the agents and can check for anomalous actions and/or values. A workstation operated by (Continued)

a human can also send its work output to the orchestrator and this output, along with the steps performed by the human, can be analyzed to determine if the task executed can be done by a robotic agent.

13 Claims, 2 Drawing Sheets

(51) Int. Cl.
*G06N 3/08* (2023.01)
*G06Q 10/0631* (2023.01)
*G06Q 10/0639* (2023.01)

(52) U.S. Cl.
CPC ... *G06Q 10/06312* (2013.01); *G06Q 10/0639* (2013.01)

(58) Field of Classification Search
CPC ............. G06N 20/00; G06Q 10/06312; G06Q 10/0639
See application file for complete search history.

(56) References Cited

U.S. PATENT DOCUMENTS

| | | | | |
|---|---|---|---|---|
| 10,234,848 | B2* | 3/2019 | Mehr | G05B 19/4099 |
| 2012/0215583 | A1 | 8/2012 | Kunti et al. | |
| 2014/0025613 | A1* | 1/2014 | Ponulak | G06N 3/08 |
| | | | | 706/25 |
| 2017/0173784 | A1 | 6/2017 | Shah | |
| 2017/0228119 | A1* | 8/2017 | Hosbettu | G06T 7/13 |
| 2017/0243135 | A1 | 8/2017 | Ooba et al. | |
| 2017/0293844 | A1 | 10/2017 | Gombolay et al. | |
| 2017/0352041 | A1 | 12/2017 | Ramamurthy et al. | |
| 2018/0012159 | A1* | 1/2018 | Kozloski | G06N 20/00 |
| 2018/0043532 | A1 | 2/2018 | Lection et al. | |
| 2018/0068255 | A1* | 3/2018 | Hance | G06Q 10/087 |
| 2018/0068514 | A1 | 3/2018 | Li et al. | |
| 2018/0150298 | A1 | 5/2018 | Balle et al. | |
| 2018/0164775 | A1* | 6/2018 | Crivella | B25J 9/1687 |
| 2018/0165604 | A1* | 6/2018 | Minkin | G06Q 10/06 |
| 2018/0200884 | A1* | 7/2018 | Perets | B25J 9/163 |
| 2019/0176337 | A1* | 6/2019 | Yuan | G05D 1/0217 |
| 2019/0286990 | A1* | 9/2019 | Kenney | G06N 3/084 |

* cited by examiner

SYSTEM AND METHOD FOR ROBOTIC AGENT MANAGEMENT

CROSS REFERENCE TO RELATED APPLICATIONS

The present application is a U.S. National Phase Application pursuant to 35 U.S.C. § 371 of International Application No. PCT/CA2019/051375 filed Sep. 26, 2019, which claims priority to U.S. Provisional Patent Application No. 62/738,463 filed Sep. 28, 2018. The entire disclosure contents of these applications are herewith incorporated by reference into the present application.

TECHNICAL FIELD

The present invention relates to robotic process automation (RPA) systems that perform repetitive tasks based on a programmed set of instructions. More specifically, the present invention relates to the use of machine learning as applied to such automation systems to enhance the capabilities of such systems.

BACKGROUND

The rise of automation since the late 20th century is well documented. The application of such automated systems in manufacturing is well-known. These automated systems that perform pre-programmed, repetitive tasks are now being used not just in manufacturing but in other areas of industry and human activity. These have been used in scientific laboratories to carry out repetitive tasks that may be prone to error when executed by humans. They are now also beginning to be used in industries where they can provide error free execution of mundane, repetitive tasks. One major development in the past few years has been the rise of RPA (Robotic Process Automation). Instead of having a physical robot perform repetitive physical tasks, a robotic agent is used to perform repetitive virtual tasks on a graphical user interface. As an example, copying data from one form into another form and then saving the result is a task that RPA agents are well-suited to perform. Not only are the agents fast, they are also accurate.

While robots are useful and while they individually excel in performing such repetitive tasks, they are not coordinated as a group. Thus, efficiencies that may be had by viewing robotic agent operations as a group are usually lost opportunities. In addition to this, robotic agents are not, by their very nature, fault tolerant nor are the able to detect issues with the data they are working with. If programmed to process data, these robotic agents blindly process the data, even if there are issues with the data. These robotic agents are thus incorrigibly deterministic. Any errors encountered in the data are happily ignored unless the robotic agent is specifically programmed to find such errors.

There is therefore a need for systems and methods that can coordinate multiple robotic agents for efficiency gains. As well, it is preferred that such systems and methods allow for anomaly or error checking without having to program each and every possible combination of error or anomaly that may be encountered.

SUMMARY

The present invention provides systems and methods for managing and enhancing the performance of a number of robotic agents. An orchestrator module receives work output from a number of robotic agents and determines whether efficiencies can be obtained by rescheduling tasks and/or steps executed by the various robotic agents. As well, the orchestrator learns the various actions and values used by the agents and can check for anomalous actions and/or values. A workstation operated by a human can also send its work output to the orchestrator and this output, along with the steps performed by the human, can be analyzed to determine if the task executed can be done by a robotic agent or to determine a more optimal means of executing that task.

In a first aspect, the present invention provides a method for enhancing a performance of a plurality of robotic agents, the method comprising:
- a) receiving a schedule of tasks to be executed by said robotic agents;
- b) receiving steps executed by each of said robotic agents for each of said tasks;
- c) determining, using machine learning, dependencies between said steps executed by different robotic agents;
- d) determining, using machine learning, adjustments to said steps to thereby optimize at least one of said tasks.

In a second aspect, the present invention provides a method for detecting at least one anomaly in a system where tasks are executed by at least one robotic agent, the method comprising:
- a) continuously receiving a work output from said at least one robotic agent;
- b) using said work output in a training set to continuously train a machine learning system such that said machine learning system learns a range of actions and values from said at least one robotic agent;
- c) continuously assessing said work output against said range of actions and values for said at least one robotic agent;
- d) in the event at least one aspect of said work output is outside said range of actions and values for said robotic agent, generating an alert for a user and generating a report for said user;

wherein said report comprises an explanation regarding said alert.

In a third aspect, the present invention provides a method for determining candidate tasks for automation, the method comprising:
- a) continuously receiving a work output from a user workstation, said work output comprising steps executed by a human on said user workstation in executing a task;
- b) determining, using machine learning, if said steps executed by said user are executable by a robotic agent;
- c) in the event said steps are executable by a robotic agent, generating a report for a user detailing said steps executable by said robotic agent.

In a fourth aspect, the present invention provides a system for executing a plurality of tasks, the system comprising:
- a plurality of robotic agents, each of said plurality of robotic agents executing at least one task from said plurality of tasks;
- an orchestrator module for managing said plurality of robotic agents, said orchestrator module receiving a work output from at least one of said plurality of robotic agents;

wherein
- at least one of said plurality of robotic agents reports steps carried out in executing said at least one task to said orchestrator module.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
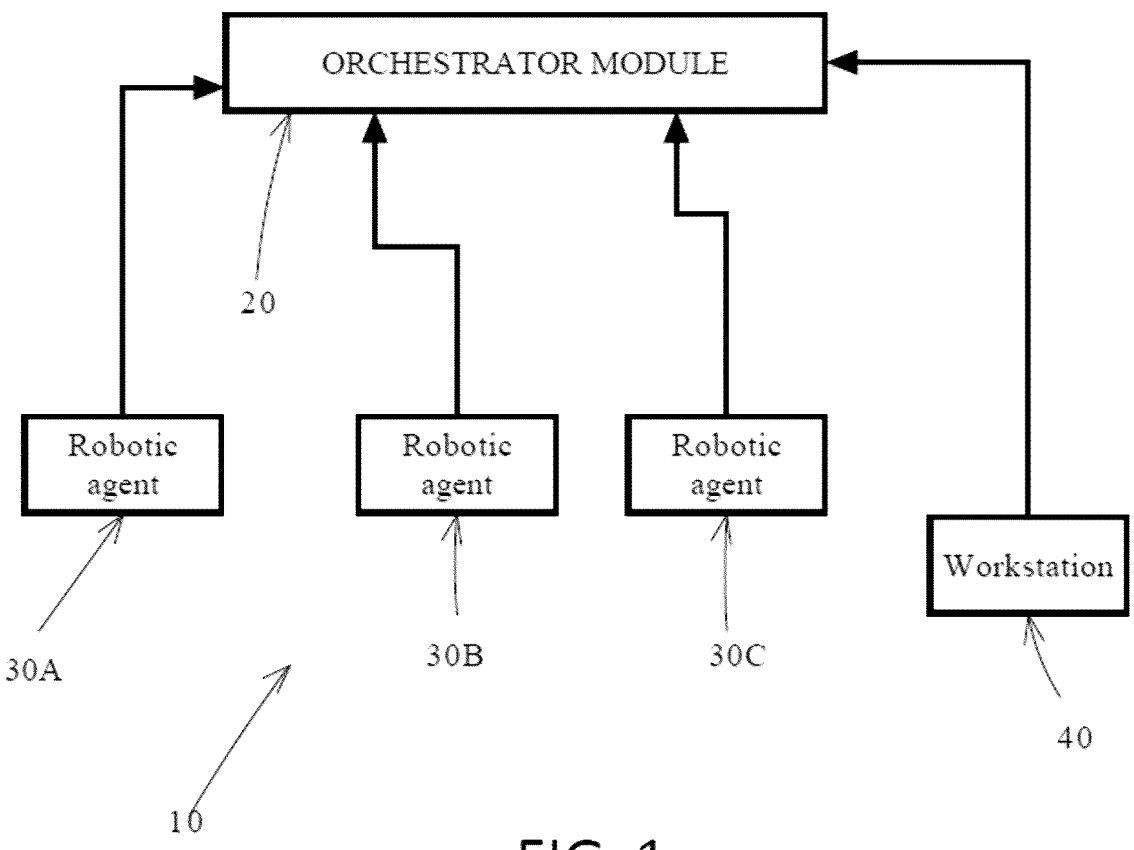
FIG. 1 is a block diagram of a system according to one aspect of the present invention.

The present invention relates to the application of machine learning and artificial intelligence methods and systems to robotic process automation agents (hereinafter referred to as "robotic agents"). As noted above, these robotic agents are useful in executing repetitive tasks that require little or no human judgment. In particular, the various aspects of the present invention relate to the application of such machine learning methods and techniques to a plurality of robotic agents. These robotic agents may be executing different tasks on different pieces of data from different sources or they may all be performing a single task on different pieces of data. Regardless of the task being executed, a fleet of robotic agents may benefit from a coordinated system-wide scheduling of tasks. Not only that, but there may be dependencies between the various steps taken by different robotic agents. These dependencies may affect the scheduling of task and, by rearranging the order not only of the steps but of the execution of tasks, efficiencies may be obtained. Additionally, the rearranging of tasks for a single robotic agent may provide that robotic agent with even more efficiencies relative to its tasks. Also in addition, redundant tasks and/or steps can be identified and removed.

As is well known and as explained above, robotic agents are useful for executing mundane, repetitive tasks that require little to no human judgment. Because of this, errors in the data may not be detected nor addressed by such robotic agents. Such errors may lead to further errors and may adversely affect the work product of full systems unless these errors are caught early in the process.

Because these robotic agents are useful for performing these mundane, repetitive tasks, they are well-suited to replace humans who may be prone to errors because of the mundanity and repetitiveness of their tasks. However, determining which tasks may be suitable for a robotic agent may not be straightforward. A long process with many steps may be involved and determining which steps may be executed by a robotic agent may be difficult as some steps may be dependent on the results of other steps. Similarly, the repetitive nature (or redundancy or accuracy) of any of the steps may not be readily apparent as the repetitive steps may be disguised by intervening non-repetitive steps.

One solution to the above issues is a system that uses an orchestrator module or an orchestrator subsystem, with the orchestrator receiving data and/or work output from the various robotic agents in the system. In addition, the orchestrator would also be receiving work output and data from at least one workstation operated by a human operator. The orchestrator module, by using machine learning techniques and methods can analyze and recommend changes to the scheduling of tasks executed by the robotic agents. As well, the orchestrator module can recommend changes to how, for each task executed by a robotic agent, the steps can be adjusted or reworked to achieve efficiencies. In addition, any dependencies between the data required and/or produced by different robotic agents can be determined. These dependencies can be reduced by rearranging and/or rescheduling both tasks and steps so that, preferably, different robotic agents can execute tasks independently of one another. Reordered schedules, tasks, and steps can be generated iteratively and implemented to determine which order or which schedule can provide the best efficiencies for the system as a whole. By allowing independence between robotic agents, different agents can execute in parallel, thereby achieving more efficiencies within the system.

Such a system can also operate to check for errors in data and in the execution of tasks by the robotic agents. With machine learning techniques, the orchestrator module can learn the inputs and outputs of the robotic agents as well as the sequence of steps that each robotic agent performs when executing its tasks. Then, by continuously monitoring the inputs and outputs of each robotic agent as well as the actions of each robotic agent, any significant deviation from expected steps and/or input/output data and/or format/type of such data can be reported. In addition, any failures in the transmission or reception of expected data to and from each robotic agent can be monitored. Such an orchestrator module would compare the inputs and outputs of each robotic agent with the learned inputs, outputs, and data transformations for that specific robotic agent. If the data to and from the specific robotic agent is not within an expected envelope (as learned from the historical inputs and outputs of the robotic agent), the orchestrator module can report the issue to a user with a sufficient explanation of the problem. Additionally, the orchestrator module can recommend corrective actions to avoid such issues in the future. Or, depending on the implementation, the orchestrator module can simply correct the error (e.g. data format errors) to ensure that the data received is in the expected format.

To determine which tasks executed by a human agent or operator on a workstation, the system's orchestrator module can be coupled to receive the steps being performed by the human. Then, again using machine learning techniques, the orchestrator module can analyze the steps and determine which tasks and subtasks can be automated. Repetitive tasks and data dependencies can be determined and, if necessary, the steps and/or tasks executed by the human agent can be reordered to allow for automation by robotic agents. Reports regarding potential automation candidates for the tasks or the steps carried out by the human operator can then be generated. Such a report can, of course, be a suggested automation script. Active learning methods can also be applied to this aspect of the present invention.

Referring to FIG. 1, a block diagram of a system according to one aspect of the invention is illustrated. The system 10 includes an orchestrator module 20 that is coupled to multiple robotic agents 30A, 30B, 30C. Each of the robotic agents are executing tasks that may be similar to one another or they may be different. As well, these tasks may be related to each other or they may be independent of one another. In one embodiment, the orchestrator module is also coupled to at least one workstation 40 operated by a human agent or operator. It should be noted that the orchestrator module may be coupled to the robotic agents as well as the human operated workstation or the orchestrator module may only be coupled to the robotic agents. As well, in one implementation, the orchestrator module may only be coupled to the human operated workstation and not to the robotic agents.

It should be clear that while the orchestrator module is shown as being a single device/module in FIG. 1, the module may take the form of multiple modules or submodules. As an example, one or more submodules may be coupled to the robotic agents while another submodule may be coupled to the human operated workstation. As well, each submodule may be tasked with separate functions based on what the submodule is coupled to. One submodule may thus be tasked with scheduling efficiencies for the robotic agents while another may be tasked with data/task/step error checking for the robotic agents. Yet another submodule may be tasked with finding efficiencies and recommendations for automation for human operated workstations. Such a collector submodule may receive and organize the information received from the different agents/workstations. Other specific intelligence modules may review the information and generate optimal recommendations regarding scheduling, task optimization, etc.

As noted above, the system 10 can operate to determine if efficiencies can be obtained by merely rescheduling different tasks for different robotic agents or by reworking an order of steps performed by robotic agents when executing a task. As well, efficiencies may also be obtained by examining data dependencies between tasks and/or steps and reordering tasks/steps to remove such data dependencies.

Figure 2:
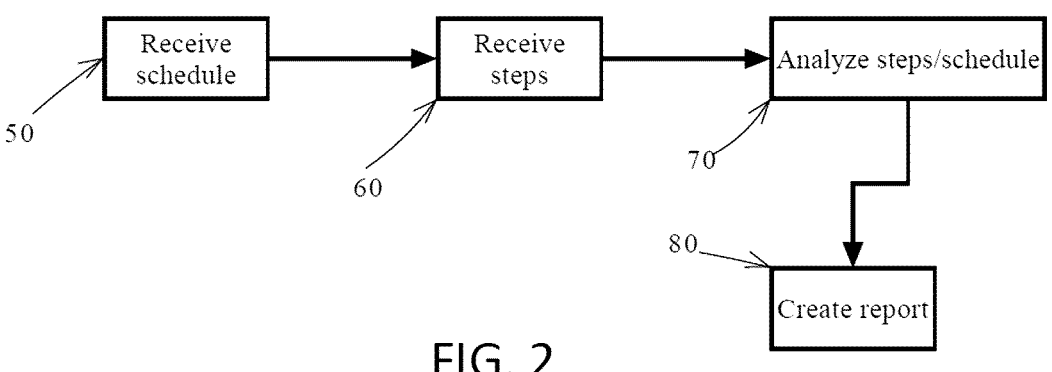
FIG. 2 is a flowchart detailing one method according to another aspect of the present invention.

Referring to FIG. 2, a flowchart detailing the steps in a method according to one aspect of the invention is illustrated. In this method, efficiencies relating to multiple robotic agents are sought using machine learning techniques. The method begins at step 50 where the system receives a schedule for the execution of one or more tasks by one or more robotic agents. In step 60, the system receives the steps performed by each of the robotic agents when executing their tasks. The schedule and the steps are then analyzed in step 70 to search for data dependencies between tasks and/or steps that may be eliminated through rescheduling tasks or rearranging steps. As noted above, step 70 may be executed using machine learning methods and techniques such as neural networks. Such neural networks may be trained in optimization techniques and in searching for and identifying data dependencies between different data flows. In addition, the neural networks may be paired with submodules that can generate suitable what-if scenarios to determine if rearranging schedules and/or tasks and/or steps will generate efficiencies. Of course, efficiencies can include faster execution times, better utilization of resources, and higher overall throughput.

Once the data from the robotic agents have been analyzed and efficiency enhancing measures have been determined, these measures can be passed to a reporting module (step 80). A suitable report can then be prepared for a user with these measures as recommendations. It should be clear that the data flow from the robotic agents to the system can be continuous and the analysis of such data can also be continuous, as would be the reporting. This way, new schedules, new tasks, and new steps are continuously taken into account and continuously analyzed by the system. The optimization of schedules, steps, dependencies, and the like is thus continuous and the system is rarely static.

Figure 3:
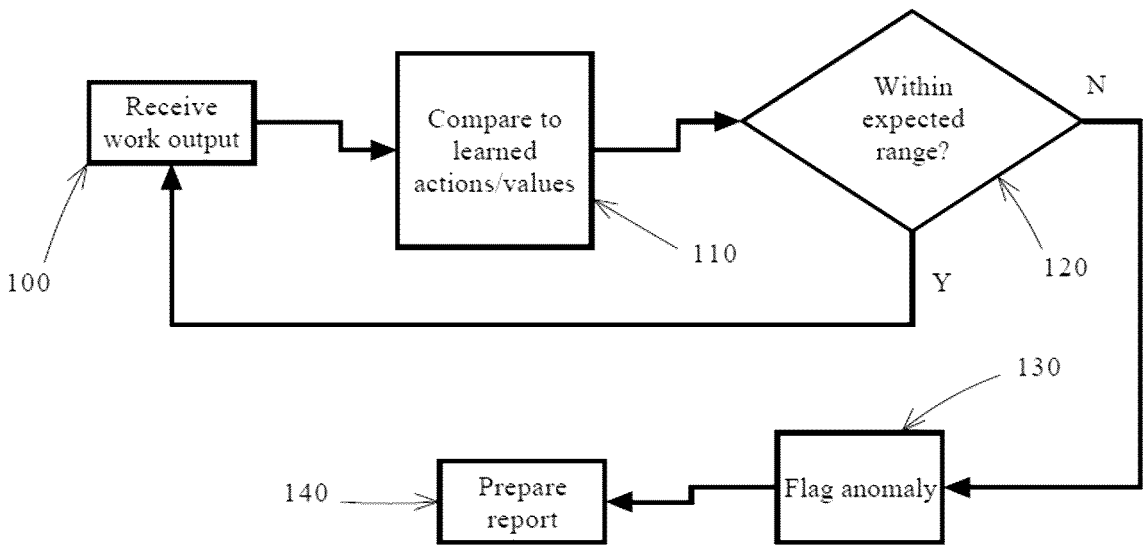
FIG. 3 is another flowchart detailing another method according to yet another aspect of the present invention.

Referring to FIG. 3, a flowchart detailing the steps in another method according to another aspect of the present invention is illustrated. This method relates to continuously monitoring the input, output, and throughput of the various robotic agents to ensure that their tasks are being completed successfully and the data being produced is within expected parameters. In the flowchart, the method begins with the system receiving a work output from the various robotic agents (step 100). Work output can include the data being received by the robotic agent, data being produced by the robotic agent, steps being taken by the robotic agent to process the data, and any other data that may require checking to ensure correctness of the process. This work output is then learned by the system using, as noted above, machine learning techniques and methods such as neural networks. The neural networks can thus be trained on an on-going basis (using, for example reinforcement learning techniques) on the work output of each robotic agent. By learning the expected inputs, outputs, and steps of multiple instances of work output from a single robotic agent, the system can learn the range of actions and values that are expected from that robotic agent. Other machine learning techniques may, of course, be used including supervised learning, semi-supervised learning, deep learning and any combination of the above. Nothing in this document should be taken as limiting the scope of the invention to any of the details disclosed herein.

Once the work output has been received, this is then compared to the learned behaviour/learned range of actions and values from previous work outputs of the same or similar robotic agent (step 110). Decision 120 then determines if the work output recently received is within the expected range of actions and values for that robotic agent. If the work output is within the expected range, then the logic of the method loops back to receive more work output from the robotic agent. If, however, the work output is outside of the expected actions and values for that robotic agent, then the system flags the anomalous data (e.g. an anomalous value, an anomalous action or step taken by the robotic agent, or any combination of the two) in step 130. A report is then prepared and sent to the user to notify the user of the anomalous data received from the robotic agent (step 140). Of course, other steps may be inserted into the method, including that of using the work output in one or more training sets to train one or more machine learning models.

It should be clear that while the method in FIG. 3 is performed on a per robotic agent basis, the system may also perform the method on a system wide level. This means that, instead of the system learning the expected actions and values for each of the various robotic agents, the system instead learns the actions and values of all (or most) of the robotic agents. If a system wide error in terms of data and/or actions is encountered, then a report is sent to a user.

The method in FIG. 3 can also be extended to monitor the various robotic agents for both silent and noisy failures. A noisy failure is one that generates an error message or something of the like while a silent failure is one where the consequences are not known at the time of the failure. As an example of a noisy failure, having a numeric value when a letter value is expected will probably cause an error message and this may cause the robotic agent to fail. Conversely, an example of a silent failure may be when a value of between 10-15 is expected but a value of 1000 is entered. The difference in values may not cause the robotic agent to fail but may cause other failures and errors due to the processing of a clearly erroneous value. The method can thus be used to monitor for these types of failures. For noisy failures, a robotic agent that fails to complete its task may be flagged by the system for a report to the user. The report would detail the failure, identify the robotic agent, and provide data regarding the process being executed, the values being used, and the type of failure encountered. Similarly, if a potential silent failure is encountered (e.g. a value that is very different from an expected value is used), the system would recognize that the value encountered is beyond the expected actions and values for that robotic agent. A report would thus be generated detailing the identity of the robotic agent, the process being executed, the values being processed, the type of potential error encountered, the source of the error encountered, and a suggested corrective action. In addition, the expected range of values for that potential erroneous value may also be provided in the report. This way, a user can easily be provided with the relevant information necessary to troubleshoot and/or solve a potential issue.

As noted above, the method detailed in FIG. 3 can detect anomalous values used in the execution of a task. In addition to this, the system can also detect anomalous actions performed by the robotic agent. As an example, a malfunctioning robotic agent may, instead of entering data in field x, may enter the data into fields x and y. If an input into field y is not expected, then this occurrence can generate a suitable alert and a suitable report for a user. As another example, the system can detect if the robotic agent is erroneously copying and/or pasting data from erroneous data sources as well as erroneous data destinations. Because the system has learned the steps to be taken by the robotic agent, any actions that are different from what is expected can be caught. Thus, anomalous actions and anomalous values can be detected. Malfunctioning robotic agents, erroneous data, and other gremlins in the system can thus be logged and flagged for a user to resolve.

Figure 4:
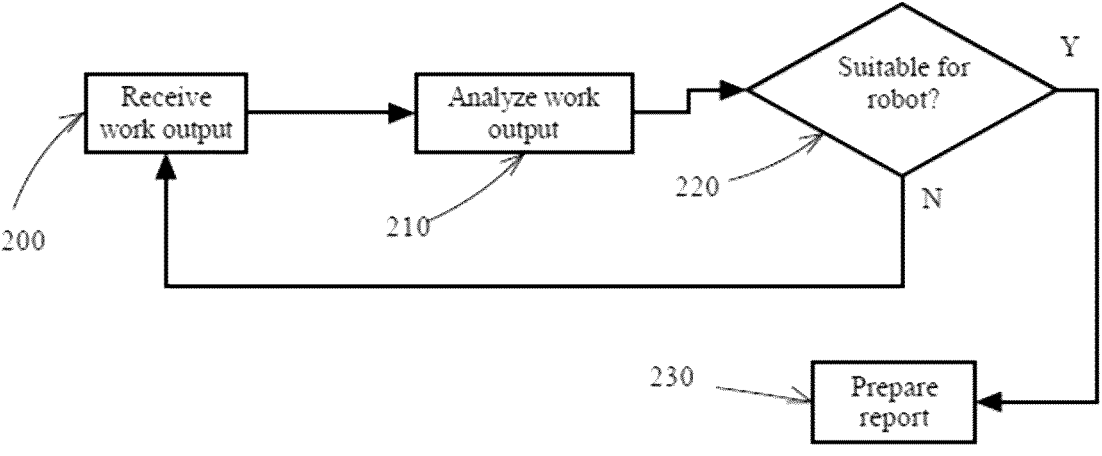
FIG. 4 is a further flowchart detailing a further method according to a further aspect of the present invention.

Referring to FIG. 4, a flowchart for yet another method according to another aspect of the present invention is illustrated. The method described in the Figure relates to monitoring and analyzing the steps performed by a human on a workstation. As noted above, the system illustrated in FIG. 1 may be used to execute this method. In this method, the steps taken by the human operator or agent is analyzed and, if necessary, reordered to determine if the task being executed is suitable to be performed by a robotic agent. To this end, data dependencies between different steps in the task may be determined and, if possible, reduced or eliminated by reordering the steps. In addition, the judgment (or lack thereof) that may be required by the task or steps can be assessed to determine if a robotic agent can perform that judgment or if human judgment is necessary.

In FIG. 4, the method begins with the system receiving work output from the workstation being operated by a human agent (step 200). This work output is then analyzed in step 210 for data dependencies, judgment requirements, and possibly step rearrangement to reduce any data dependencies. Based on the analysis, a decision 220 is then made as to whether one or more steps or tasks executed by the human operator can be executed by a robotic agent. If the response is negative, then the logic flow returns to step 200 of receiving further work product from the workstation. One the other hand, if the response is positive that one or more steps can be executed by a suitable robotic agent, the system then prepares a report (step 230) for a user. The report, as above, would explain the steps that can be automated and, preferably, would detail any other changes that may need to be made to render the task/step suitable for automation.

It should be noted that the various aspects of the present invention as well as all details in this document may be implemented to address issues encountered in all manners of business related dealings as well as all manners of business issues. Accordingly, the details in this document may be used in the furtherance of any aims, desires, or values of any department in any enterprise including any end result that is advantageous for the fields of accounting, marketing, manufacturing, management, and/or human resource management as well as any expression, field, or interpretation of human activity that may be considered to be business related.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by any type of data processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for enhancing a performance of a plurality of robotic process automation (RPA) agents, the method being executed by at least one processor, the at least one processor being operatively connected to the plurality of RPA agents, the method comprising:

receiving, by the at least one processor, a schedule of tasks comprising a first task and a second task to be executed by the plurality of RPA agents, each task of the schedule of tasks comprising a plurality of steps, wherein a first one or more RPA agents of the plurality of RPA agents is configured to execute the first task corresponding to a first type of task of the schedule of tasks and a second one or more RPA agents of the plurality of RPA agents is configured to execute the second task of a second type of task of the schedule of tasks, wherein the first type of task includes error checking for the plurality of RPA agents;

receiving, by the at least one processor, a plurality of inputs of each of the plurality of RPA agents, a plurality of outputs of each of the plurality of RPA agents, and the plurality of steps executed by each of the plurality of RPA agents for each task of the schedule of tasks;

determining, by the at least one processor, using machine learning, based on the plurality of inputs, the plurality of outputs, and the plurality of steps, dependencies between the plurality of steps executed by different RPA agents of the plurality of RPA agents, wherein at least a step corresponding to the second task is dependent on an output, or the plurality of outputs, of at least an additional step corresponding to the first task; and determining, by the at least one processor, using machine learning, adjustments to the schedule of tasks and adjustments to the plurality of steps comprising reordering the plurality of steps, based at least in part on the dependencies between the plurality of steps executed by the different RPA agents of the plurality of RPA agents, to thereby optimize at least one task of the schedule of tasks, wherein optimizing at least one task comprises a higher overall task throughput, or both.

2. The method according to claim 1, wherein the adjustments to the schedule of tasks to thereby optimize the at least one task of the schedule of tasks comprises reordering the schedule of tasks.

3. The method according to claim 1, further comprising formulating a report regarding the adjustments to the plurality of steps, the report being for sending to a user to confirm the adjustments to the plurality of steps.

4. The method according to claim 1, further comprising optimizing a distribution of tasks across the plurality of RPA agents to thereby achieve efficiencies across the plurality of RPA agents.

5. A system for enhancing a performance of a plurality of robotic process automation (RPA) agents, the system comprising:

at least one non-transitory storage medium storing computer-readable instructions; and at least one processor operatively connected to the at least one non-transitory storage medium, the at least one processor, upon executing the computer-readable instructions, being configured to cause:

executing a plurality of RPA agents, each of the plurality of RPA agents executing at least one task from a schedule of tasks;

executing an orchestrator module for managing the plurality of RPA agents, the orchestrator module being configured for:

receiving the schedule of tasks comprising a first task and a second task to be executed by the plurality of RPA agents, each task of the schedule of tasks comprising a plurality of steps, wherein a first one or more RPA agents of the plurality of RPA agents is configured to execute the first task corresponding to a first type of task of the schedule of tasks and a second one or more RPA agents of the plurality of RPA agents is configured to execute the second task of a second type of task of the schedule of tasks;

receiving a plurality of inputs of each of the plurality of RPA agents, a plurality of outputs of each of the plurality of RPA agents, and the plurality of steps executed by each of the plurality of RPA agents for each task of the schedule of tasks, wherein the first type of task includes error checking for the plurality of RPA agents;

determining, using machine learning, based on the plurality of inputs, the plurality of outputs, and the plurality of steps, dependencies between the plurality of steps executed by different RPA agents of the plurality of RPA agents, wherein at least a step corresponding to the second task is dependent on an output, or the plurality of outputs, of at least an additional step corresponding to the first task; and determining, using machine learning and the at least one processor, adjustments to the schedule of tasks and adjustments to the plurality of steps comprising reordering of the plurality of steps, based at least in part on the dependencies between the plurality of steps executed by the different RPA agents of the plurality of RPA agents, to thereby optimize at least one task of the schedule of tasks, wherein optimizing at least one task comprises a higher overall task throughput.

6. The system according to claim 5, wherein the orchestrator module is further configured to receive a work output from a workstation operated by at least one human agent.

7. The system according to claim 6, wherein the work output from the workstation sends detailed steps executed on the workstation to the orchestrator module.

8. The system according to claim 5, wherein the orchestrator module is configured for producing reports for sending to a user, the reports detailing adjustments to the schedule of tasks for executing each task of the schedule of tasks by the RPA agents to thereby optimize an execution of at least one task from the schedule of tasks.

9. The system according to claim 5, wherein the orchestrator module is configured for producing reports for sending to a user, the reports detailing adjustments to the schedule of tasks to thereby reallocate the tasks across the plurality of RPA agents to thereby optimize an execution of at least one task from the schedule of tasks.

10. The method according to claim 1, wherein the adjustments to the plurality of steps comprises changing an order in which at least some of the steps are executed.

11. The method according to claim 2, wherein the adjustments to the schedule of tasks comprises changing an order in which at least some of the tasks are executed.

12. The method according to claim 1, wherein the plurality of inputs, plurality of outputs, and plurality of steps correspond to the first type of task, the second type of task, or both.

13. The method of claim 1, wherein the second type of task includes scheduling efficiencies of the RPA agents.

\* \* \* \* \*